(12) United States Patent
Kim et al.

(10) Patent No.: US 12,093,739 B2
(45) Date of Patent: Sep. 17, 2024

(54) METHOD AND APPARATUS FOR MANAGING THREADS IN MANYCORE

(71) Applicant: MetisX CO., Ltd., Yongin-si (KR)

(72) Inventors: Ju Hyun Kim, Yongin-si (KR); Jae Wan Yeon, Yongin-si (KR); Kwang Sun Lee, Yongin-si (KR)

(73) Assignee: MetisX CO., Ltd., Yongin-si (KR)

( * ) Notice: Subject to any disclaimer, the term of this patent is extended or adjusted under 35 U.S.C. 154(b) by 0 days.

(21) Appl. No.: 18/417,445

(22) Filed: Jan. 19, 2024

(65) Prior Publication Data

US 2024/0281293 A1    Aug. 22, 2024

(30) Foreign Application Priority Data

Feb. 21, 2023   (KR) .................. 10-2023-0022751

(51) Int. Cl.
*G06F 9/50*      (2006.01)

(52) U.S. Cl.
CPC .......... *G06F 9/5038* (2013.01); *G06F 9/5072* (2013.01); *G06F 2209/5018* (2013.01); *G06F 2209/505* (2013.01)

(58) Field of Classification Search
CPC .................................................. G06F 9/5038
See application file for complete search history.

(56) References Cited

U.S. PATENT DOCUMENTS

| | | | |
|---|---|---|---|
| 2003/0225976 A1 | 12/2003 | Hokenek et al. | |
| 2005/0160413 A1* | 7/2005 | Broussard | G06F 9/5072 |
| | | | 717/148 |
| 2006/0143350 A1* | 6/2006 | Miloushev | G06F 13/00 |
| | | | 710/242 |
| 2017/0269966 A1 | 9/2017 | Kim et al. | |
| 2020/0183738 A1 | 6/2020 | Champigny | |

FOREIGN PATENT DOCUMENTS

| | | |
|---|---|---|
| KR | 10-1999-0080204 A | 11/1999 |
| KR | 10-2005-0069934 A | 7/2005 |
| KR | 10-2016-0080385 A | 7/2016 |
| KR | 10-2016-0105774 A | 9/2016 |
| KR | 10-2017-0109185 A | 9/2017 |
| KR | 10-2021-0057184 A | 5/2021 |
| WO | 2015/063466 A1 | 5/2015 |

OTHER PUBLICATIONS

"Request for the Submission of an Opinion" Office Action issued in KR 10-2023-0022751; mailed by the Korean Intellectual Property Office on Apr. 12, 2023.
"Written Decision on Registration" Office Action issued in KR 10-2023-0022751; mailed by the Korean Intellectual Property Office on Aug. 21, 2023.

* cited by examiner

*Primary Examiner* — Charlie Sun
(74) *Attorney, Agent, or Firm* — Studebaker & Brackett PC

(57) ABSTRACT

A method for managing threads in a manycore system is launched by one or more processors, and includes receiving, from a host processor, a job descriptor associated with one or more tasks according to an offloading request of the host processor, generating threads for each of the one or more tasks based on the job descriptor, and allocating the generated threads to one or more cores of a cluster that includes a plurality of cores.

7 Claims, 9 Drawing Sheets

METHOD AND APPARATUS FOR MANAGING THREADS IN MANYCORE

CROSS-REFERENCE TO RELATED APPLICATION

This application claims priority to Korean Patent Application No. 10-2023-0022751, filed in the Korean Intellectual Property Office on Feb. 21, 2023, the entire contents of which are hereby incorporated by reference.

TECHNICAL FIELD

The present disclosure relates to a method and apparatus for managing threads in a manycore system, and more specifically, to a method and apparatus for allocating a thread generated for a task requested to be offloaded from a host processor to one of a plurality of cores, and launching and synchronizing the same.

BACKGROUND

In general, a manycore system may refer to a computer architecture with multiple processor cores on a single chip. The manycore system can distribute the workload of the program requested by the host processor to multiple process cores, thereby improving the performance of parallel computing jobs for the corresponding workload. Since the manycore system can provide significant performance improvements compared to the existing single-core system, dual-core system, etc., demand is increasing in fields that require a large amount of computing resources, such as artificial intelligence model learning.

Meanwhile, multithreading is a computer programming technique that allows a plurality of threads or command sequences to be launched concurrently within a single process. In manycore systems, multithreading allows multiple jobs related to an application to be launched concurrently, thereby improving the performance of the application.

In order to achieve good performance with multithreading, it essentially requires an efficient synchronization mechanism, and good scheduling and load balancing capabilities are also necessary. However, if multithreading management is not properly performed in the computing device to which multithreading is applied, application performance improvement through multithreading may be limited.

SUMMARY

In order to solve one or more problems (e.g., the problems described above and/or other problems not explicitly described herein), the present disclosure provides a method for, a non-transitory computer-readable recording medium storing instructions for, and a system (apparatus) for managing threads in a manycore system.

The present disclosure may be implemented in a variety of ways, including a method, a system (apparatus), or a non-transitory computer-readable recording medium storing instructions.

A method for managing threads in a manycore system may be executed by one or more processors and may include receiving, from a host processor, a job descriptor associated with one or more tasks according to an offloading request of the host processor, generating threads for each of the one or more tasks based on the job descriptor, and allocating the generated threads to one or more cores of a cluster that includes a plurality of cores.

The allocating the generated thread to the one or more cores may include allocating the generated threads to the one or more cores based on thread state information associated with threads previously allocated to the one or more cores, in which the thread state information may be updated based on a state register associated with threads previously allocated to the one or more cores.

The method may further include pushing, into a thread operation queue, operation information associated with an operation of the generated threads, receiving, by the one or more cores, the operation information from the thread operation queue, and in response to the one or more cores receiving the operation information, removing the operation information from the thread operation queue.

The operation information may include thread launch information associated with a launch of the generated threads, and the one or more cores may launch the generated threads based on the thread launch information.

The operation information may further include thread termination information associated with a termination of the threads launched based on the thread launch information, the receiving the operation information from the thread operation queue may include in response to completion of the tasks of the launched threads, receiving, by the one or more cores, thread termination information from the thread operation queue, and if the one or more cores terminate executing the threads based on the thread termination information, the job descriptor may be pushed into a termination queue.

The job descriptor pushed into the termination queue may be transmitted to the host processor or to a cluster different from the cluster including the one or more cores.

The operation information may further include thread synchronization information associated with a synchronization between the thread launched based on the thread launch information and a thread different from the launched thread, the receiving the operation information from the thread operation queue may include receiving, by the one or more cores, the thread synchronization information from the thread operation queue, in response to a request for synchronization between the launched thread and a thread different from the launched thread, and the launched thread may be switched to a sleep state based on the thread synchronization information.

The method may further include receiving, by the one or more cores, thread synchronization completion information, in response to completion the of the synchronization between launched thread and the thread different from the launched thread, in which the thread switched to the sleep state may be released from the sleep state based on the thread synchronization completion information.

A computer program is provided, which is stored on a computer-readable recording medium for executing, on a computer, the method described above according to the embodiment. A manycore system may include a plurality of cores, and a plurality of clusters each including a management module for threads launched by one or more of the plurality of cores, in which the management module may be configured to receive, from a host processor, a job descriptor associated with one or more tasks according to an offloading request of the host processor, generate threads for each of the one or more tasks based on the job descriptor, and allocate the generated threads to one or more cores of one of the plurality of clusters.

In various examples of the present disclosure, one or more threads generated based on the job descriptor associated with the task according to an offloading request from the host processor can be allocated to one or more cores included in the cluster of the manycore system that supports multithreading in hardware. Accordingly, overhead due to context switching between threads can be minimized, and performance of applications such as big data analysis that frequently require thread parallel processing can be improved.

In various examples of the present disclosure, threads are allocated to cores based on thread state information associated with a plurality of cores of the manycore system, thereby preventing factors that can degrade system performance, such as resource contention between threads.

In various examples of the present disclosure, threads can be generated in an asynchronous manner, and the state of the threads can be switched to or released from the sleep state, thereby achieving efficient thread synchronization.

The effects of the present disclosure are not limited to the effects described above, and other effects not described herein can be clearly understood by those of ordinary skill in the art (hereinafter referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
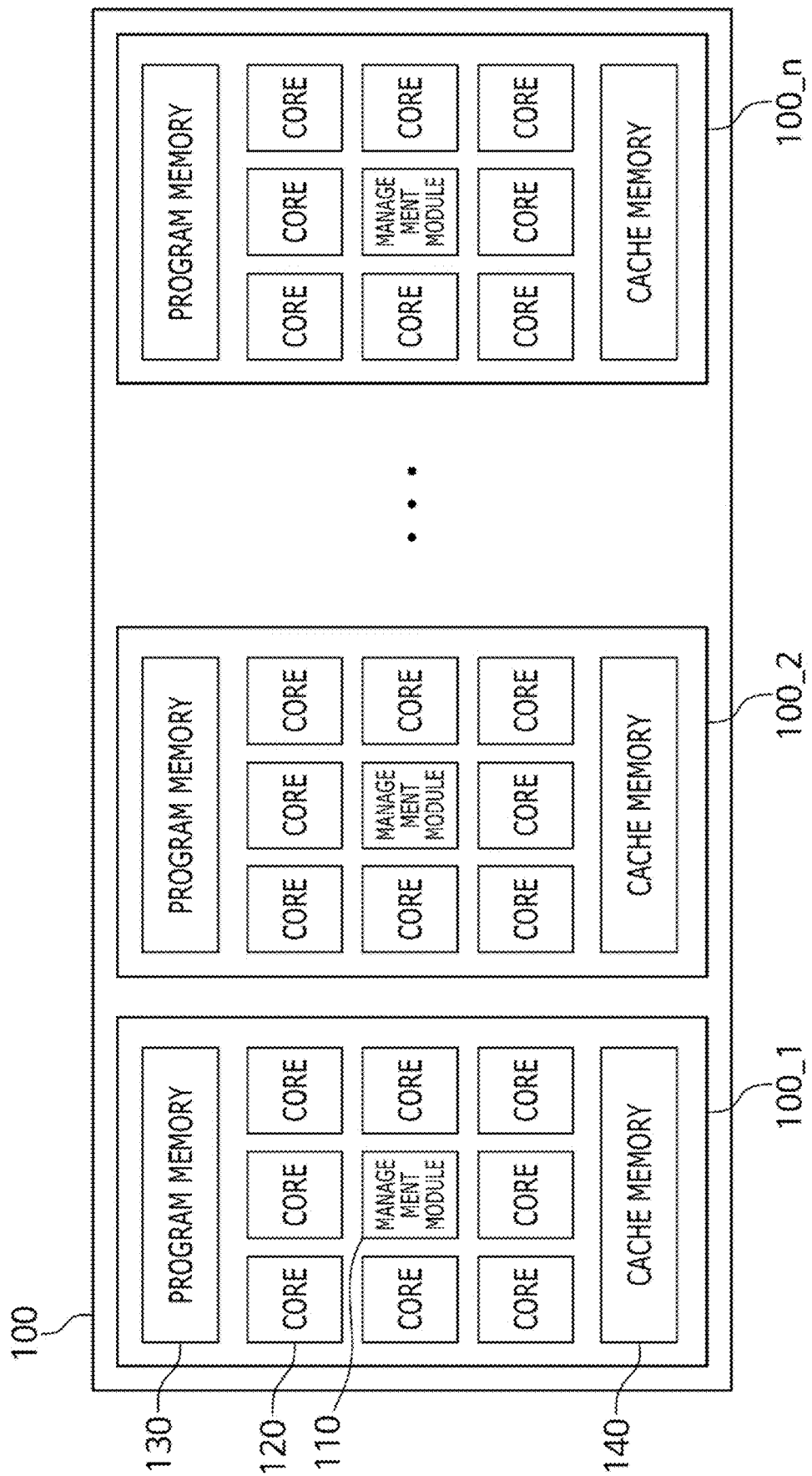
FIG. 1 is a block diagram illustrating an internal configuration of a manycore system.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

The singular forms "a," "an," and "the" as used herein are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In this disclosure, "offloading" may refer to transferring data from a local device or network to another device or network to reduce the amount of data that has be processed or stored on the local device or network, or to assist the processing performance of the local device, thereby improving the performance of an application.

In the disclosure, a "task" may refer to a unit of jobs to be performed by a processor or such unit job. For example, the "task" may be a stand-alone job or a set of jobs that have to be completed in a specific order.

In the disclosure, a "thread" may refer to a unit launch flow within a process. Additionally and alternatively, the "thread" may refer to a particular memory space on a memory to which such launch flow is allocated.

In the present disclosure, "sleep" may refer to the thread or launch being temporarily paused. At this time, the thread remains in memory and maintains its state, but may not currently be using the processor's resources, and launching the thread may resume when the thread is released from the sleep state.

FIG. 1 is a block diagram illustrating an internal configuration of a manycore system 100. As illustrated, the manycore system 100 may include a plurality of clusters 100_1 to 100_n each including a plurality of cores 120 (where, n is a natural number). The manycore system 100 may be a computing structure that can be further expanded by including a larger number of clusters using a cluster as a basic unit.

Each of the plurality of clusters 100_1 to 100_n may include a management module 110, a plurality of cores 120, a program memory 130, and a cache memory 140, but is not limited to that illustrated in FIG. 1. For example, each of the plurality of clusters 100_1 to 100_n may further include a co-processor. The co-processor may be individually included and used in each of the plurality of cores 120 according to the required performance or functional characteristics of the manycore system 100 or cluster, or may be shared and used by the plurality of cores 120.

The program may be executed by a plurality of threads in the plurality of clusters 100_1 to 100_n. For example, the program may be executed by a plurality of threads allocated to one cluster (or to a plurality of cores included in one cluster) or may be executed by a plurality of threads allocated to several clusters (or to a plurality of cores included in each of the several clusters).

A plurality of threads may be concurrently launched in each of the plurality of cores 120. For example, if 10 cores are included in one cluster and each of the 10 cores can concurrently launch 4 threads, the number of threads that can be concurrently launched in the corresponding cluster may be 40.

The management module 110 may perform management jobs associated with the threads and control launching the plurality of cores 120. For example, the management module 110 may generate a thread for each of one or more tasks based on a job descriptor associated with the one or more tasks according to an offloading request of the host processor from the host processor and allocate the generated thread to one or more cores of a cluster that includes a plurality of cores.

The management module 110 may push operation information associated with an operation of the generated thread into a thread operation queue. In response to at least one of the plurality of cores 120 receiving the operation information from the thread operation queue, the management module 110 may remove the operation information from the thread operation queue. For example, the operation information associated with the operation of the thread may include thread launch information, thread termination information, thread synchronization information, and/or thread synchronization completion information.

Each of the plurality of cores 120 may be a single processing unit that is capable of launching commands, and each core may launch a separate program or one or more threads. Hardware-wise, each of the plurality of cores 120 may be configured to concurrently launch a plurality of threads. Each of the plurality of cores 120 may be a component for supporting the concurrent launch and include a program counter, a thread register file, etc. which track a launch flow for each thread. Additionally, each of the plurality of cores 120 may further include several execution units, L0 cache (level 0 cache and/or micro-operation cache) memories, etc. With this configuration, each of the plurality of cores 120 may be capable of parallel processing the threads.

Each of the plurality of cores 120 may receive operation information pushed into the thread operation queue by the management module 110, and based on this, launch the thread, terminate the launched thread, or control the sleep state of the thread.

The program memory 130 may refer to a memory used by the program or threads launched in the system. The program memory 130 may be used for storing program codes and data currently being used by the program or thread. Each of the plurality of clusters 100_1 to 100_n may share one program memory 130 and thus launch the same program. Alternatively, depending on the configuration of the program memory 130, each of the plurality of clusters 100_1 to 100_n may launch several different programs.

The cache memory 140 may refer to a small amount of high-speed memory used for storing frequently accessed data. In the manycore system 100, a plurality of cores may have their own cache memory 140 or share the memory, according to which the number of times the plurality of cores 120 have to access the main memory (e.g., RAM) for loading or storing data can be reduced, thus improving performance. The cache memory 140 may include a level 1 (L1) cache memory.

Figure 2:
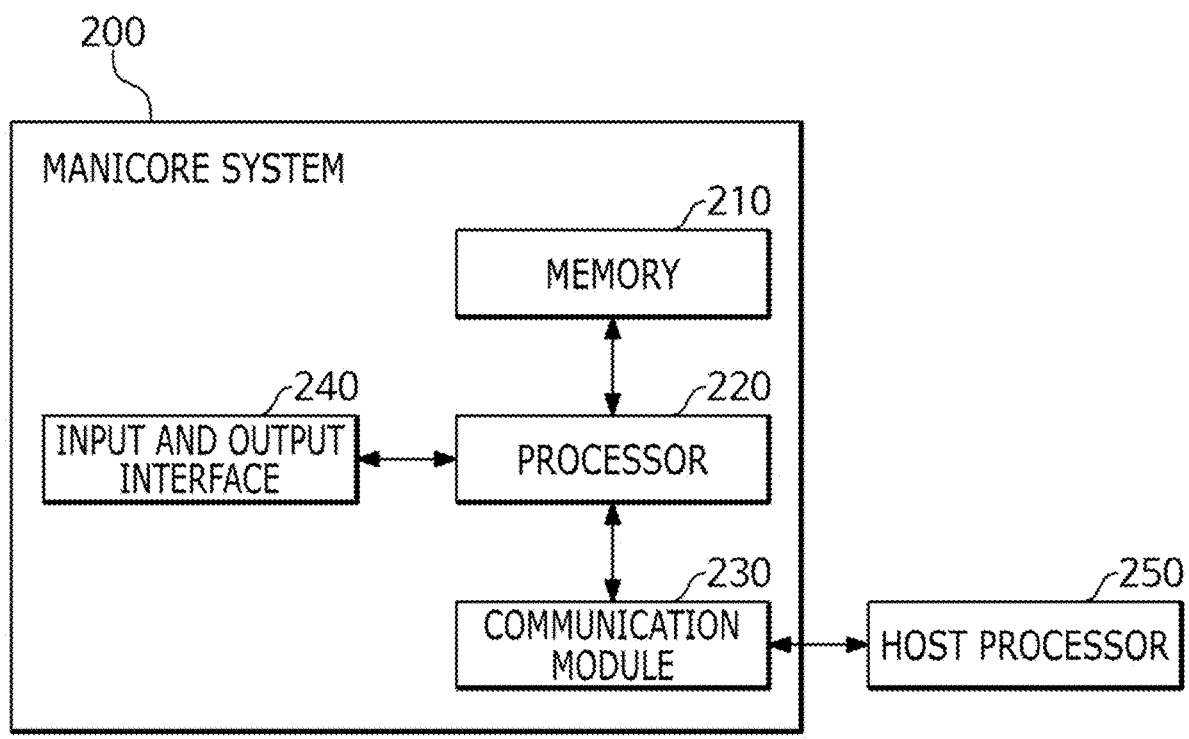
FIG. 2 is a block diagram illustrating an internal configuration of a manycore system and its relationship with a host processor.

FIG. 2 is a block diagram illustrating an internal configuration of a manycore system 200 and its relationship with a host processor 250. The manycore system 200 may include a memory 210, a processor 220, a communication module 230, and/or an input and output interface 240. As illustrated in FIG. 2, the manycore system 200 may be configured to communicate information and/or data through a network by using the communication module 230. The manycore system 200 may be configured to communicate information and/or data with the host processor 250 through a network by using the communication module 230.

The memory 210 may include any non-transitory computer-readable recording medium. The memory 210 may include a permanent mass storage device such as random access memory (RAM), read only memory (ROM), disk drive, solid state drive (SSD), flash memory, etc. As another example, a non-perishable mass storage device such as ROM, SSD, flash memory, disk drive, etc. may be included in the manycore system 200 as a separate permanent storage device separate from the memory. In addition, an operating system and/or at least one program code may be stored in the memory 210. The memory 210 may include a program memory and/or a cache memory, and the cache memory may include an L0 cache memory and/or an L1 cache memory.

These software components may be loaded from a computer-readable recording medium separate from the memory 210. Such a separate computer-readable recording medium may include a recording medium directly connectable to the manycore system 200, and may include, for example, a computer-readable recording medium such as a floppy drive, a disk, a tape, a DVD/CD-ROM drive, a memory card, etc. In another example, the software components may be loaded into the memory 210 through the communication module 230 rather than the computer-readable recording medium. For example, at least one program may be loaded into the memory 210 based on a computer program installed by files provided by developers or a file distribution system that distributes an installation file of an application through the communication module 230.

The processor 220 may be configured to process the commands of the computer program by performing basic arithmetic, logic, and input and output operations. The commands may be provided to a user terminal (not illustrated) or another external system by the memory 210 or the communication module 230. In addition, the processor 220 may be configured to manage, process, and/or store the information and/or data received from a plurality of user terminals and/or a plurality of external systems. The processor 220 may include a plurality of cores, and a thread may be allocated to and processed on each of the plurality of cores.

The communication module 230 may provide a configuration or function for the user terminal (not illustrated) and the manycore system 200 to communicate with each other through a network, and may provide a configuration or function for the manycore system 200 to communicate with an external system (e.g., a separate host processor 250, etc.). For example, control signals, commands, data, etc. provided under the control of the processor 220 of the manycore system 200 may be transmitted to the user terminal and/or the external system through the communication module 230 and the network through the communication module of the user terminal and/or an external system.

The communication module 230 may communicate with the host processor 250 and receive an offloading request from the host processor 250. Additionally, the communication module 230 may further receive, from the host processor 250, a job descriptor associated with one or more tasks according to the offloading request from the host processor 250. The processor 220 may generate a thread for each of the one or more tasks based on the job descriptor received from the host processor 250, and allocate the generated thread to one or more cores of a cluster that includes a plurality of cores.

The job descriptor received from the host processor 250 may be transmitted in the form of a predetermined data structure. For example, the job descriptor may correspond to a data structure including at least one of an ID of a job to be performed in the processor 220, a task ID, an operation option for each task, a device ID on which the job is to be performed, information of a thread to be launched, a cluster ID, a core ID, or a thread ID. Note that aspects are not limited to this configuration, and the job descriptor may further include various information required for allocating and launching threads.

In addition, the input and output interface 240 of the manycore system 200 may refer to a means for interfacing with a device (not illustrated) for inputting or outputting, which may be connected to or included in the manycore system 200. While FIG. 2 illustrates the input and output interface 240 as a component configured separately from the processor 220, aspects are not limited thereto, and the input and output interface 240 may be omitted or may be configured to be included in the processor 220. The manycore system 200 may include more components than those illustrated in FIG. 2. Meanwhile, most of the related components may not necessarily require exact illustration.

Figure 3:
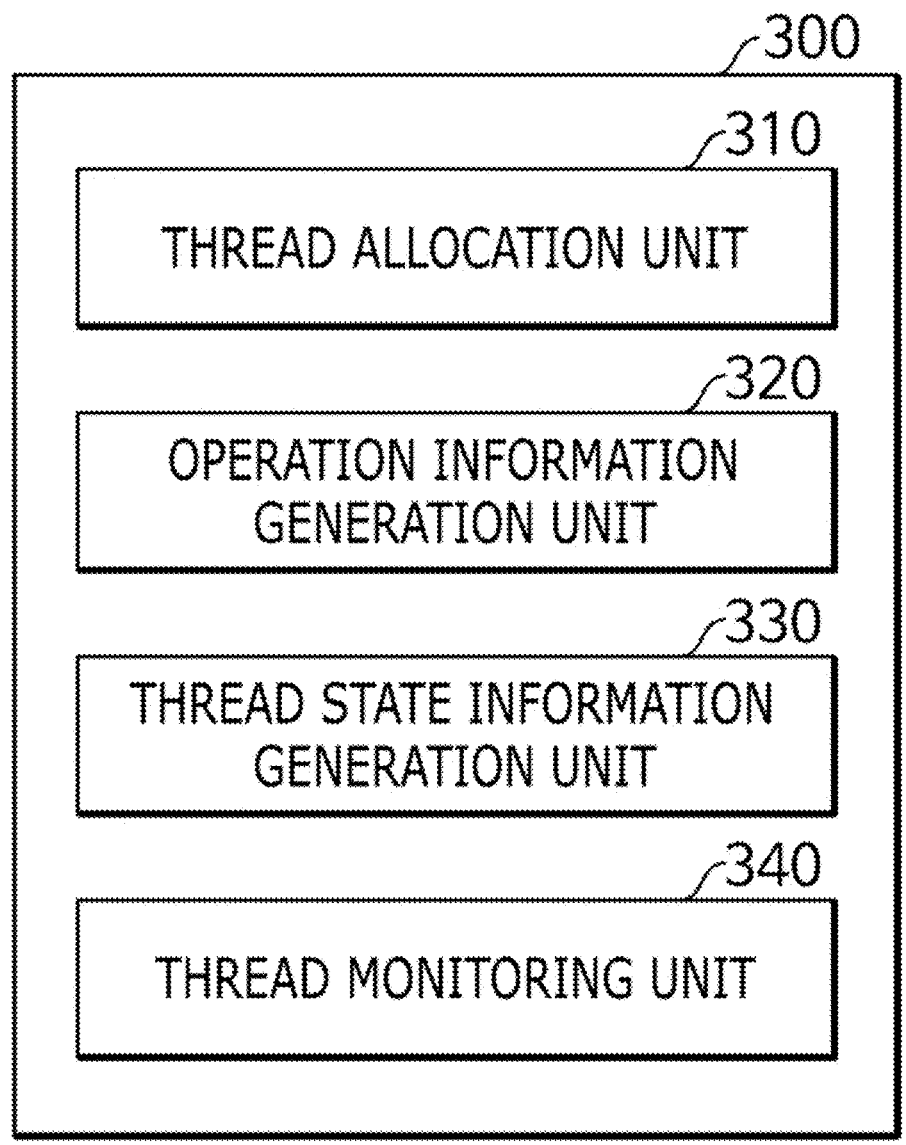
FIG. 3 is a block diagram illustrating an internal configuration of a processor of a manycore system and data input and output thereof.

FIG. 3 is a block diagram illustrating an internal configuration of a processor 300 of the manycore system and data input and output thereof. The processor 300 may correspond to a processor included in a management module of the manycore system. As illustrated, the processor 300 may include a thread allocation unit 310, an operation information generation unit 320, a thread state information generation unit 330, and a thread monitoring unit 340, but aspects are not limited thereto.

The thread allocation unit 310 may generate a thread and allocate the generated thread to the cores in the cluster. The thread allocation unit 310 may generate a thread for each of the one or more tasks based on the job descriptor associated with the one or more tasks received from the host processor.

The thread allocation unit 310 may divide a task associated with one job descriptor into a plurality of sub-tasks and generate a plurality of threads based on each sub-task. Alternatively, the thread allocation unit 310 may generate one thread for a plurality of tasks.

Specifically, the job descriptor received from the host processor may be pushed into the launch queue, and the thread allocation unit 310 may generate a thread based on the job descriptor pushed into the launch queue and remove the job descriptor associated with the generated thread from the launch queue. Through this configuration, the thread allocation unit 310 may sequentially process a plurality of job descriptors received from the host processor in the order in which they are received.

The thread allocation unit 310 may allocate the generated thread to one or more cores of the cluster that includes a plurality of cores. For example, the thread allocation unit 310 may allocate the generated thread to one core in the cluster so that the generated thread is processed by the one core, or may allocate the generated thread to a plurality of cores so that the generated thread is processed concurrently by the plurality of cores.

The thread allocation unit 310 may allocate the generated thread to one or more cores based on thread state information associated with threads previously allocated to the one or more cores. At this time, the thread state information may be the information generated by the thread state information generation unit 330.

For example, if there is an idle space within the core to be allocated with a thread, the thread allocation unit 310 may allocate the thread to that space, and if there is no idle space within the core to be allocated with the thread or if launching the thread in a space designated by the host processor is not completed, the thread allocation unit 310 may make the allocation of the thread wait.

The operation information generation unit 320 may generate operation information associated with the operation of the thread so that the operation information is transmitted to the core. The operation information generated by the operation information generation unit 320 may be pushed into a thread operation queue such that one or more cores may receive the operation information from the thread operation queue. The operation information may be removed from the thread operation queue in response to the one or more cores receiving the operation information.

The operation information generated by the operation information generation unit 320 may include thread launch information associated with the launch of the generated thread. The one or more cores may launch the generated thread based on the thread launch information.

In another example, the operation information generated by the operation information generation unit 320 may include thread termination information associated with the termination of a thread launched based on the thread launch information. One or more cores may receive the thread termination information from the thread operation queue in response to completion of the task of the launched thread. If the one or more cores terminates the execution of the thread based on the thread termination information, the job descriptor may be pushed into the termination queue, and the job descriptor pushed into the termination queue may be transmitted to the host processor or to a cluster different from the cluster including the one or more cores, so that the remaining job can be completed.

In still another example, the operation information generated by the operation information generation unit 320 may include thread synchronization information associated with a synchronization between a thread launched based on the thread launch information and a thread different from the launched thread.

For example, in response to a request for synchronization between the launched thread and the thread different from the launched thread, the one or more cores may receive the thread synchronization information from the thread operation queue, and the launched thread may be switched to a sleep state based on the thread synchronization information. In response to completion of the synchronization between the launched thread and the thread different launched thread, the one or more cores may receive thread synchronization completion information, and the thread switched to the sleep state may be released from the sleep state based on the thread synchronization completion information.

Examples and specific details of the operation information generated by the operation information generation unit 320 will be described in detail below with reference to FIGS. 6 to 8.

The thread state information generation unit 330 may generate or update the thread state information associated with the threads previously allocated to the one or more cores. The thread state information may include state information regarding whether the corresponding thread is in a launchable state, whether it is in a sleep state, etc., but is not limited thereto. The thread state information generation unit 330 may update the thread state information based on a state register associated with the threads previously allocated to the one or more cores. For example, if a thread is allocated to the core, the state register of the allocated thread may be updated, and the thread state information generation unit 330 may update the thread state information based on the same.

The thread monitoring unit 340 may monitor a resource usage status of the thread or detect whether there is an abnormality in thread operation. Additionally, the thread monitoring unit 340 may perform a routine for initial setting of each of a plurality of clusters, or may support debugging.

The internal configuration of the processor 300 illustrated in FIG. 3 is only an example, and in some examples, configurations other than the illustrated internal configuration may be additionally included, and some configurations may be omitted. For example, if part of the internal configuration is omitted, the processor of the information processing system may be configured to perform the functions of the omitted part of the internal configuration. In addition, although the internal configuration of the processor 300 has been categorized by functions and described in FIG. 4, it does not necessarily mean that they are physically separated. In addition, although the thread allocation unit 310, the operation information generation unit 320, the thread state information generation unit 330, and the thread monitoring unit 340 have been separately described above, this is for the purpose of facilitating understanding of the disclosure, and aspects are not limited thereto.

Figure 4:
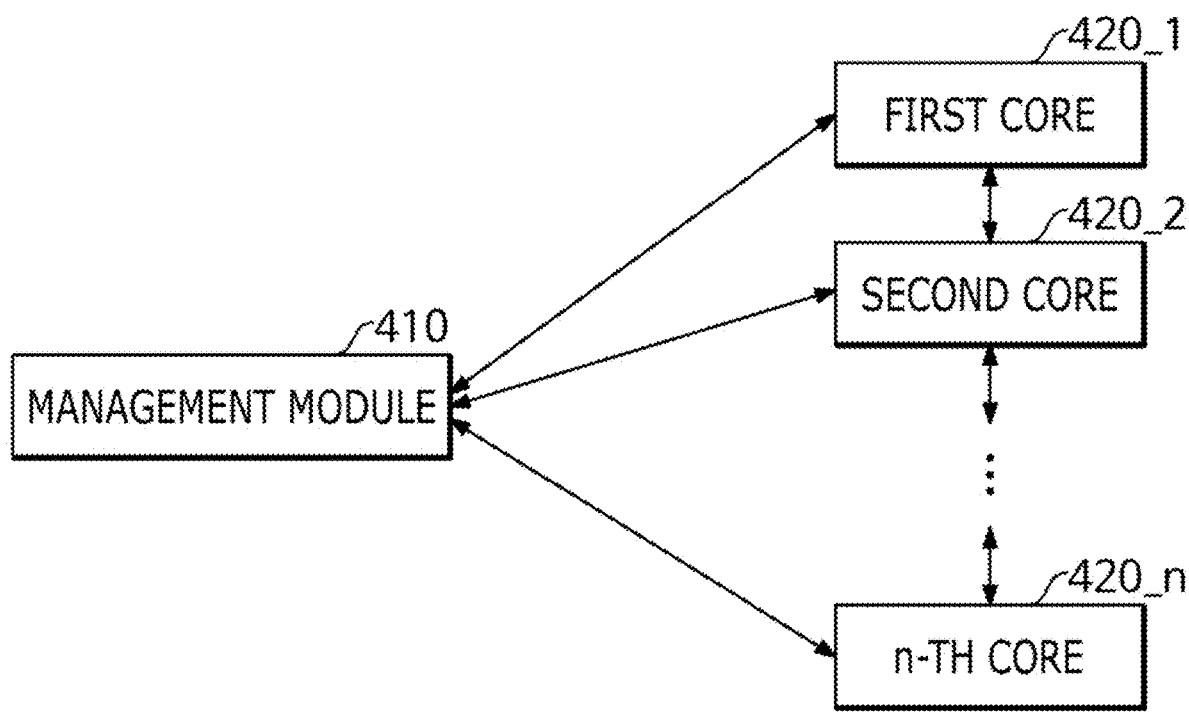
FIG. 4 is a diagram illustrating a plurality of cores and a management module managing the plurality of cores.

FIG. 4 is a diagram illustrating a plurality of cores 420_1 to 420_n and a management module 410 that manages the plurality of cores. The management module 410 may generate threads for each of one or more tasks based on the job descriptors associated with the tasks, as described above with reference to FIG. 3.

The management module 410 may allocate the threads to at least one of the plurality of cores 420_1 to 420_n in the cluster that includes the plurality of cores 420_1 to 420_n, manage the launch and termination of the allocated threads, and process a synchronization request if synchronization between threads is necessary.

That is, the management module 410 may launch the threads allocated to the plurality of cores 420_1 to 420_n, terminate a thread that is launched, or synchronize a plurality of threads launched in the plurality of cores 420_1 to 420_n.

The management module 410 may include a separate hardware device or software code associated with the plurality of cores 420_1 to 420_n.

Figure 5:
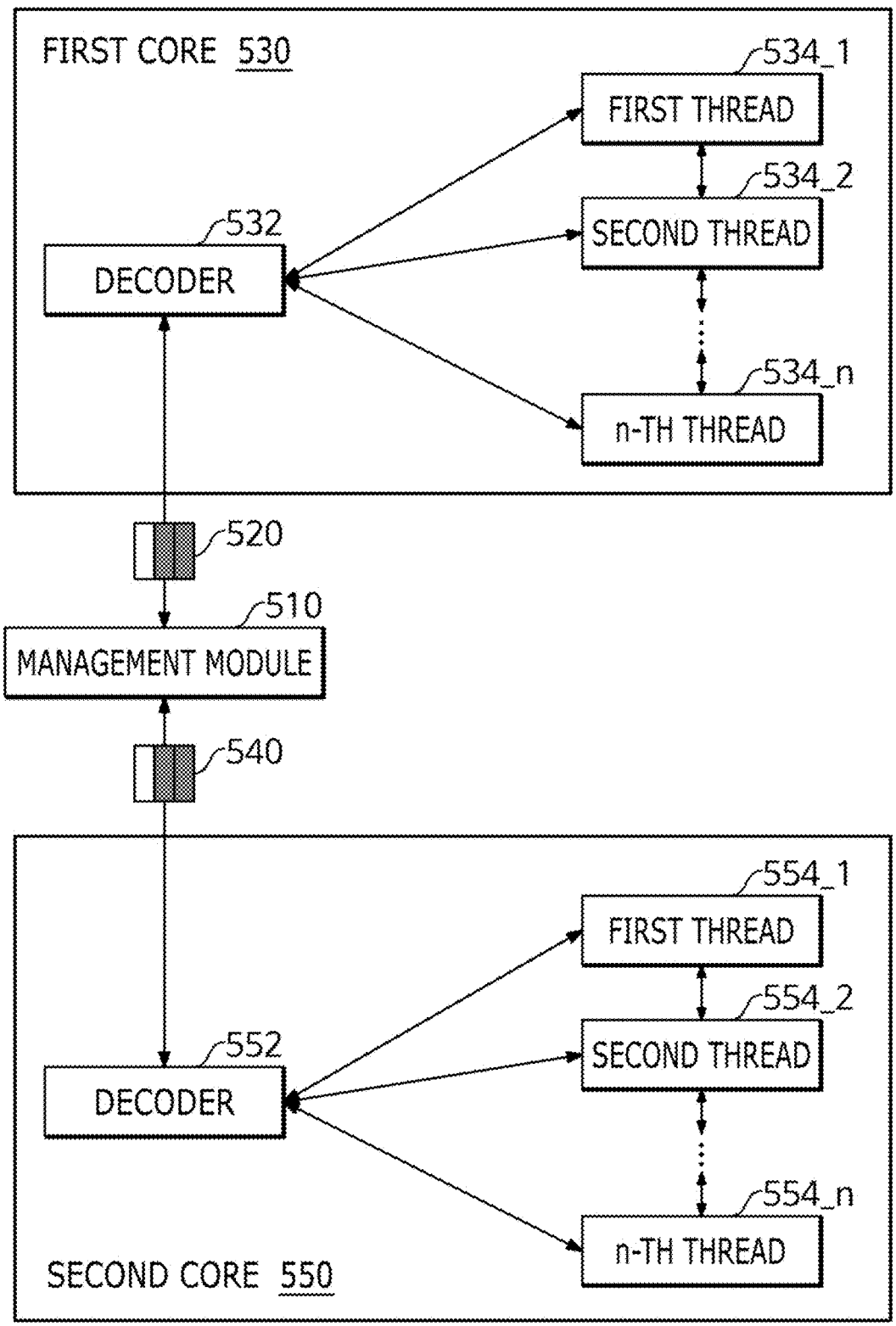
FIG. 5 is a diagram illustrating an example in which operation information of a thread is transmitted from the management module to a core.

FIG. 5 is a diagram illustrating an example in which thread operation information is transmitted from a management module 510 to cores 530 and 550. The operation information of the thread may be pushed into at least one of thread operation queues 520 and 540, and that operation information may be received by the core corresponding to the thread operation queue into which the operation information of the thread is pushed. The core receiving the operation information may control the operation of the thread based on the received operation information. For example, in order to control the operation of a thread allocated to the first core 530, thread operation information is pushed into the first thread operation queue 520 corresponding to the first core 530, and the first core 530 may control the operation of the thread based on the operation information.

FIG. 5 illustrates that there are separate thread operation queues 520 and 540 associated with each of the first core 530 and the second core 550, but this is for convenience of explanation, and aspects are not limited thereto. For example, there may be one thread operation queue corresponding to the management module 510 and the operation information pushed into the thread operation queue may include information associated with a core including a thread to control operation such that the management module 510 may control the operation of threads allocated to a plurality of cores with only one thread operation queue.

In addition, FIG. 5 illustrates that the management module 510 is connected to the first core 530 and the second core 550, but aspects are not limited thereto and the management module 510 may be connected to all cores included in the cluster.

The thread operation information may include information (e.g., thread ID) associated with the thread to control operation and an operation code associated with the type of the thread operation, such as launch, termination, and synchronization of the thread. Additionally, the thread operation information may further include other parameters required for processing tasks of the thread or for the operation of the thread. A register may be allocated to each thread subject to operation control, and the value of the register may be changed each time the operation control is performed. This will be described below in detail with reference to FIGS. 6 to 8.

In response to the cores 530 and 550 (or decoders 532 and 552) receiving the operation information from the thread operation queues 520 and 540, the received operation information may be removed from the thread operation queues 520 and 540. Through this configuration, the cores 530 and 550 (or the decoders 532 and 552) may sequentially receive the next operation information of the thread operation queues 520 and 540.

There is no limit to the size of each of the thread operation queues 520 and 540, or it may be set in advance based on the data structure of the program, the amount of data to be processed, etc.

The cores 530 and 550 may launch code associated with the operation of the thread, thereby receiving the thread operation information from the decoders 532 and 552. Specific examples of the thread operation information and the code associated with the thread operation will be described in detail below in FIGS. 6 to 8.

Figure 6:
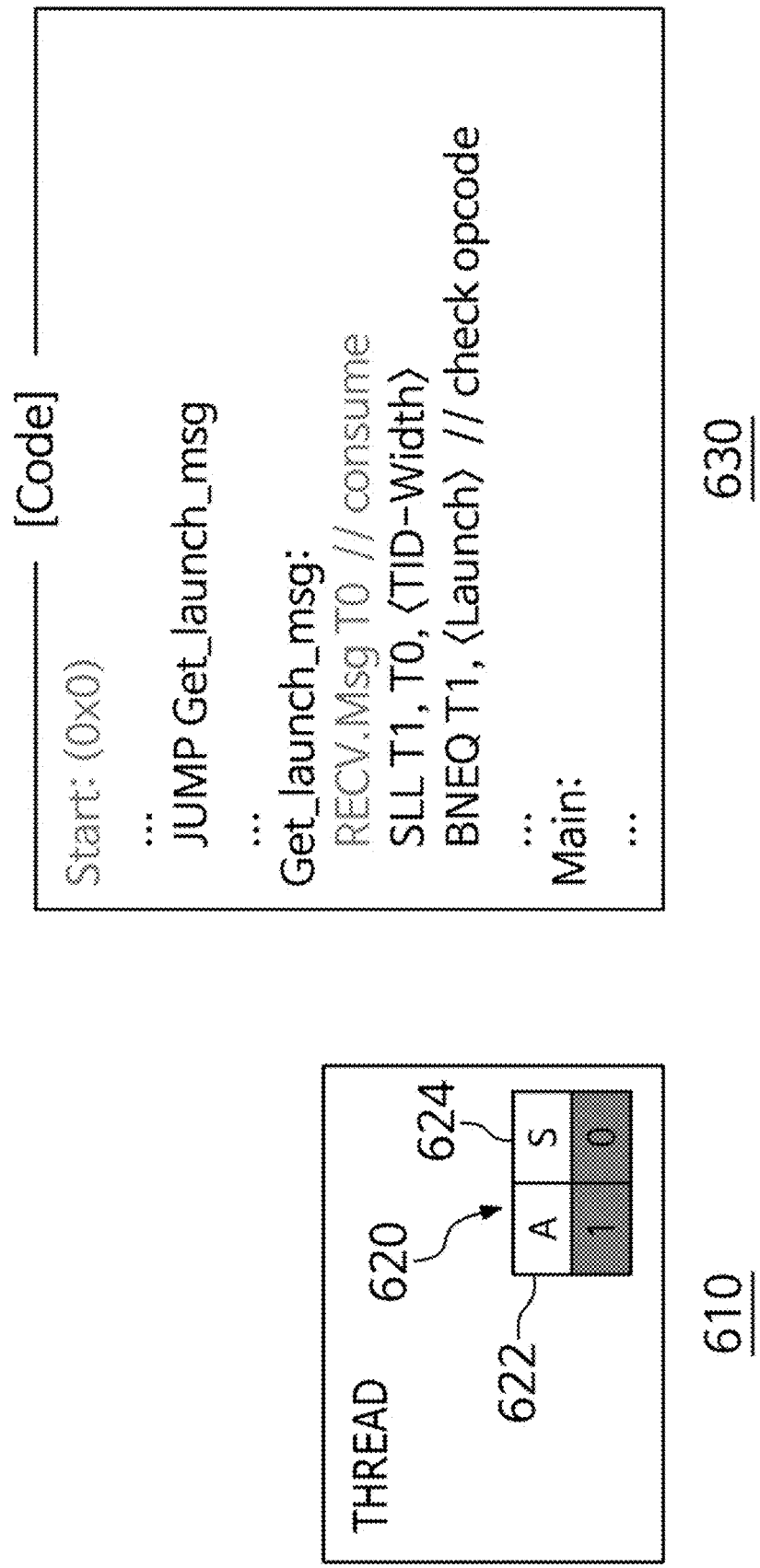
FIG. 6 is a diagram illustrating a launch target thread and a launch code associated with the launch of the thread.

FIG. 6 is a diagram illustrating a launch target thread 610 and a launch code 630 associated with the launch of the thread 610. The core allocated with the launch target thread 610 may launch the launch code 630, and the thread launch information may be received from the decoders 532 and 552 of FIG. 5. The core (or the management module corresponding to the core) including the launch target thread 610 may launch the launch target thread 610 based on the thread launch information.

Specifically, the value of a state register 620 allocated to the launch target thread may be changed based on the thread launch information. For example, the state register 620 may include an allocated bit 622 and a sleep bit 624 indicating whether the thread is launchable or not, and the value of the allocated bit 622 may be changed to "1" based on the thread launch information. Launch can be performed only on threads with an allocated bit value of "1". For example, one or more threads with allocated bit value of "1" may be launched by a separate scheduling policy.

The target thread 610 may be launched according to launch code 630. The launch code 630 may be written in assembly language. Starting from address 0x0, the thread may be launched according to the launch code 630. "RECV.Msg" command may be used in "Get_launch_msg" routine, thereby consuming the thread launch information pushed into the thread operation queue. FIG. 7 is a diagram illustrating a termination target thread 710 and a termination code 730 associated with the termination of the thread 710. The core allocated with the termination target thread 710 may launch the termination code 730, and the thread termination information may be received from the decoders 532 and 552 of FIG. 5. The core including the termination target thread 710 (or the management module corresponding to the core) may terminate executing the termination target thread 710 based on the thread termination information.

Specifically, the value of a state register 720 allocated to the termination target thread may be changed based on the thread termination information. For example, the value of an allocated bit 722 may be changed to "0" based on the thread termination information.

Termination may be performed only on threads with the allocated bit value of "0". For example, one or more threads with the allocated bit value of "0" may be terminated by a separate scheduling policy.

If the launch of the termination target thread 710 is terminated, the job descriptor associated with the thread 710 may be pushed into the termination queue. The job descriptor associated with the thread 710 pushed into the termination queue may be transmitted to the host processor in response to completion of all processing associated with the thread 710. In other examples, if processing associated with the thread 710 is not complete, the job descriptor may be transmitted on to another cluster responsible for further processing.

If the execution of the thread 710 is terminated, the thread 710 may not be launched again, and a new thread or task may be allocated to an area in the core to which the thread 710 was allocated.

The execution of the thread 710 may be terminated according to the termination code 730. The termination code 730 may be written in assembly language. In response to completion of the operation of the thread 710, the termination information of the thread 710 may be transmitted to the management module by "SEND.Term". In response, the allocated bit 722 is changed to '0', and the thread 710 may be excluded from the launch target.

Figure 8:
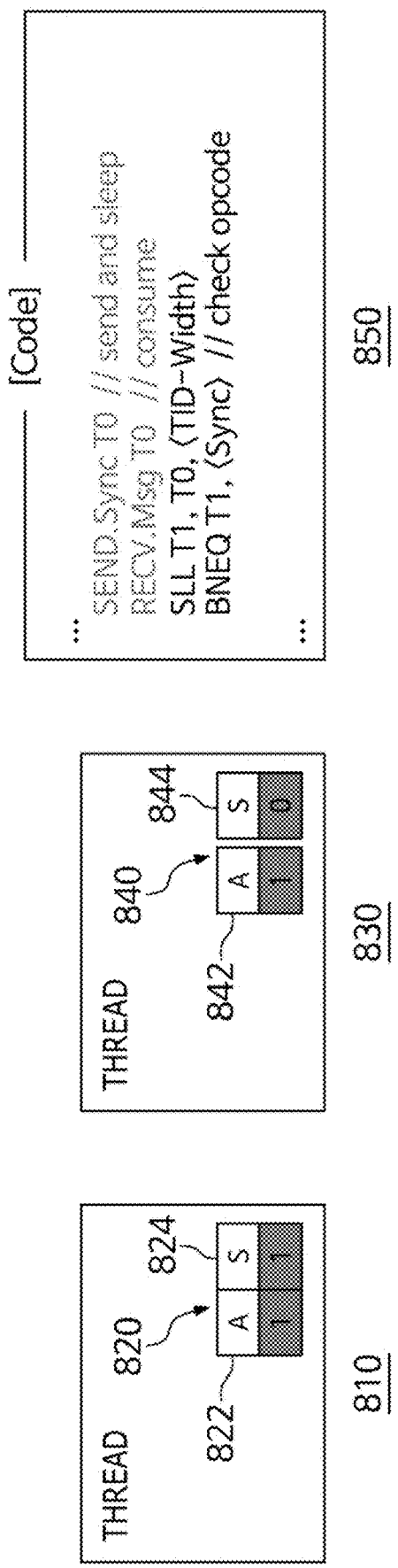
FIG. 8 is a diagram illustrating a thread and a synchronization code associated with a synchronization of the thread.

FIG. 8 is a diagram illustrating threads 810 and 830 and synchronization code 850 associated with a synchronization of the threads 810 and 830. For convenience of explanation, FIG. 8 illustrates that there are two synchronization target threads 810 and 830, but aspects are not limited thereto and any number of threads may be synchronized with each other. In addition, the core or cluster including the first thread and the core or cluster including the second thread may be the same or different from each other. That is, a plurality of threads each included in a different cores or clusters, as well as a plurality of threads each included in the same core or cluster may be synchronized with each other. Through this configuration, the operation of the threads can be consistent at specific points in the code.

The cores allocated with each of the synchronization target threads 810 and 830 may launch the synchronization code 850, and receive, from the decoders 532 and 552 in FIG. 5, the thread synchronization information associated with a synchronization between the thread launched based on the thread launch information and the thread different from the launched thread. The core (or the management module corresponding to the core) including the synchronization target threads 810 and 830 may control whether the synchronization target threads 810 and 830 are to be launched or go to sleep based on the synchronization code 850.

The sleep bit 824 in the state register 820 of the first thread 810 may be changed to "1" by "SEND. Sync" of the synchronization code 850. The first thread 810 with the sleep bit 824 changed to "1" waits in a sleep state until it receives thread synchronization completion information, and while the first thread 810 is waiting in the sleep state, another thread 830 with an allocated bit of "1" and a sleep bit of "0" may be launched.

In response to completion of the synchronization of the first thread 810 and the second thread 830 (or in response to achieving all conditions required for synchronization), the core including the first thread 810 may receive the thread synchronization completion information.

In response to the core including the first thread 810 receiving the thread synchronization completion information, the sleep bit 824 of the first thread 810 may be changed to "0" and the sleep state of the first thread 810 may be released and changed to a launchable state. At this time, the first thread 810 may be launched according to a separate thread scheduling policy.

Additionally, subsequent processing, such as a check as to whether the synchronization of the first thread 810 and the second thread 830 is performed well, etc. may be performed.

Figure 7:
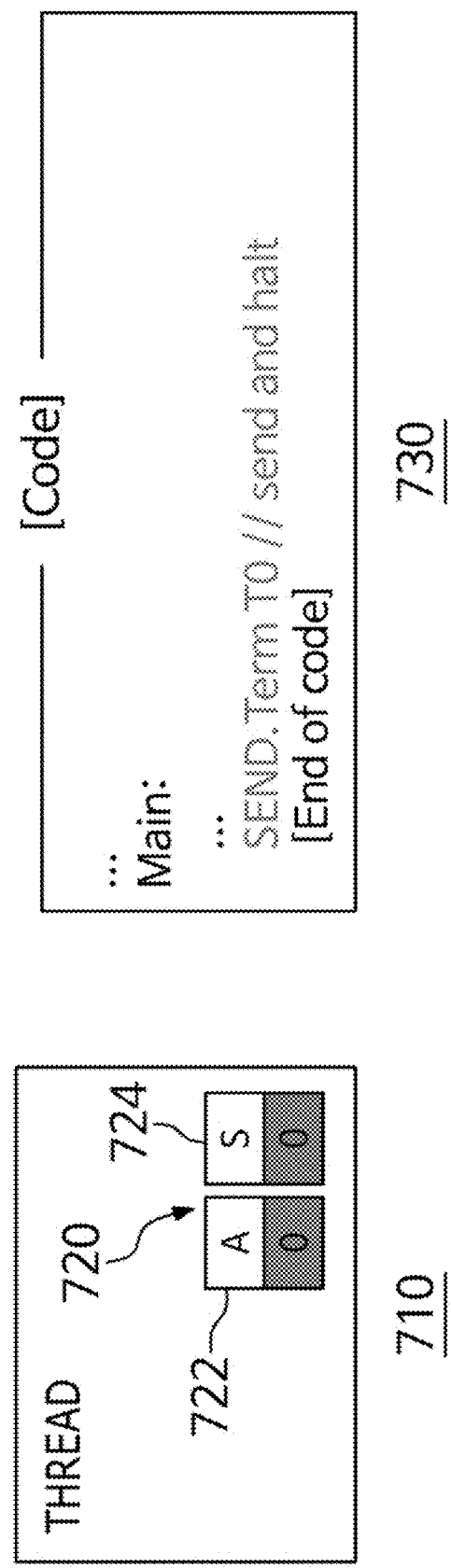
FIG. 7 is a diagram illustrating a termination target thread and a termination code associated with the termination of the thread.

The registers of the threads illustrated in FIGS. 6 to 8 are examples to help understanding, but aspects are not limited thereto. That is, each register may be configured differently from the illustration, and may include various bits associated with the operation of the thread, in addition to allocated bits and sleep bits.

Figure 9:
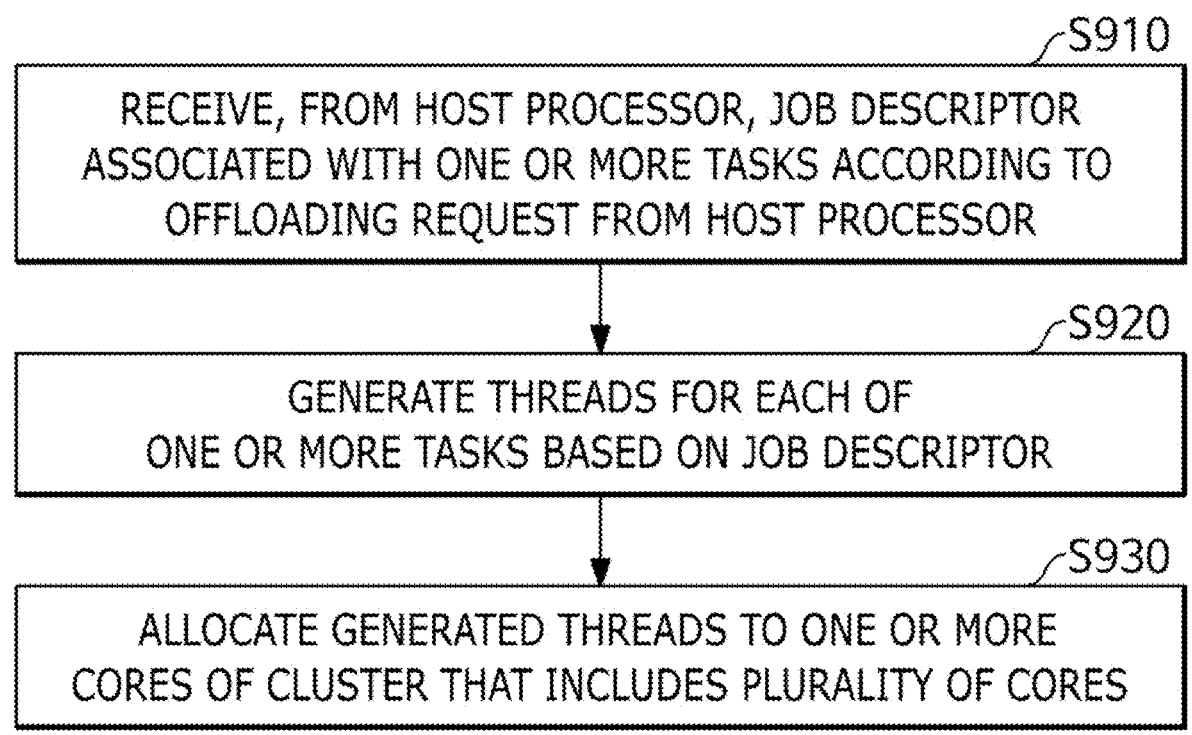
FIG. 9 is a flowchart illustrating a method for managing threads in a manycore system.

FIG. 9 is a flowchart illustrating a method 900 for managing threads in a manycore system. The method 900 for managing threads in a manycore system may be performed by a processor (e.g., one or more processors of the management module included in each of a plurality of clusters). The method 900 for managing threads in the manycore system may be initiated by the processor receiving, from the host processor, a job descriptor associated with one or more tasks according to an offloading request from the host processor, at S910.

The processor may generate a thread for each of the one or more tasks based on the job descriptor, at S920.

The processor may allocate the generated thread to one or more cores of a cluster that includes a plurality of cores, at S930.

The processor may allocate the generated thread to the one or more cores based on the thread state information associated with the threads previously allocated to the one or more cores. At this time, the thread state information may be updated based on the state register associated with the threads previously allocated to the one or more cores.

The processor may push the operation information associated with the operation of the generated thread into the thread operation queue, receive the operation information from the thread operation queue by the one or more cores, and remove the operation information from the thread operation queue in response to the one or more cores receiving the operation information.

At this time, the operation information may include the thread launch information associated with the launch of the generated thread, and the one or more cores may launch the generated thread based on the thread launch information. Alternatively, the operation information may include the thread termination information associated with the termination of the thread launched based on the thread launch information.

The processor may receive, by the one or more cores, the thread termination information from the thread operation queue in response to completion of the task of the launched thread, and if the one or more cores of the processor terminate the execution of the thread based on the thread termination information, the job descriptor may be pushed into the termination queue. At this time, the job descriptor pushed into the termination queue may be transmitted to the host processor or to a cluster different from the cluster including the one or more cores.

The operation information may further include the thread synchronization information associated with the synchronization between the thread launched based on the thread launch information and the thread different from the launched thread. The processor may receive, by the one or more cores, the thread synchronization information from the thread operation queue in response to a request for synchronization between the launched thread and the thread different from the launched thread. At this time, the launched thread may be switched to the sleep state based on the thread synchronization information.

The processor may receive, by the one or more cores, the thread synchronization completion information in response to completion of synchronization between the launched thread and the thread different from the launched thread. At this time, the thread switched to the sleep state may be released from the sleep state based on the thread synchronization completion information.

The flowchart illustrated in FIG. 9 and the above description are merely examples, and may be implemented differently in some other examples. For example, in some examples, the order of respective steps may be changed, some steps may be repeatedly performed, some steps may be omitted, or some steps may be added.

The method described above may be provided as a computer program stored in a computer-readable recording medium for launch on a computer. The medium may be a type of medium that continuously stores a program executable by a computer, or temporarily stores the program for execution or download. In addition, the medium may be a variety of writing means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for managing threads in a manycore system, the method being executed by one or more processors and comprising:
receiving, from a host processor, a job descriptor associated with one or more tasks according to an offloading request of the host processor;
generating threads for each of the one or more tasks based on the job descriptor;
allocating the generated threads to one or more cores of a cluster that includes a plurality of cores;
pushing, into a thread operation queue, operation information associated with an operation of the threads allocated to the one or more cores;
after the pushing the operation information, receiving, by the one or more cores, the operation information from the thread operation queue; and
in response to the one or more cores receiving the operation information, removing the operation information from the thread operation queue,
wherein the operation information includes thread launch information associated with a launch of the generated threads, and the one or more cores launch the generated threads based on the thread launch information,
the operation information further includes thread termination information associated with a termination of the threads launched based on the thread launch information,
the receiving the operation information from the thread operation queue includes, in response to completion of the tasks of the launched threads, receiving, by the one or more cores, thread termination information from the thread operation queue,
if the one or more cores terminate executing the threads based on the thread termination information, the job descriptor is pushed into a termination queue, and
each of the generated threads is launched asynchronously, and each of the launched threads can be terminated asynchronously.

2. The method according to claim 1, wherein the allocating the generated threads to the one or more cores includes allocating the generated threads to the one or more cores based on thread state information associated with threads previously allocated to the one or more cores, and
the thread state information is updated based on a state register associated with the threads previously allocated to the one or more cores.

3. The method according to claim 1, wherein the job descriptor pushed into the termination queue is transmitted to the host processor or to a cluster different from the cluster including the one or more cores.

4. The method according to claim 1, wherein the operation information further includes thread synchronization information associated with a synchronization between the thread launched based on the thread launch information and a thread different from the launched thread,
the receiving the operation information from the thread operation queue further includes receiving, by the one or more cores, the thread synchronization information from the thread operation queue, in response to a request for synchronization between the launched thread and the thread different from the launched thread, and
the launched thread is switched to a sleep state based on the thread synchronization information.

5. The method according to claim 4, further comprising receiving, by the one or more cores, thread synchronization completion information, in response to completion of the synchronization between the launched thread and the thread different from the launched thread,
wherein the thread switched to the sleep state is released from the sleep state based on the thread synchronization completion information.

6. A non-transitory computer-readable recording medium storing instructions that, when executed by one or more processors, cause performance of the method according to claim 1.

7. A manycore system comprising:

a plurality of cores; and a plurality of clusters each including a hardware processor for managing threads launched by one or more of the plurality of cores, wherein the hardware processor of a respective cluster of the plurality of clusters is connected with the plurality of cores included in the respective cluster of the plurality of clusters, and is configured to:

receive, from a host processor, a job descriptor associated with one or more tasks according to an offloading request of the host processor;

generate threads for each of the one or more tasks based on the job descriptor;

allocate the generated threads to one or more cores of one of the plurality of clusters;

push, into a thread operation queue, operation information associated with an operation of the threads allocated to the one or more cores;

after the pushing the operation information, receiving, by the one or more cores, the operation information from the thread operation queue; and in response to the one or more cores receiving the operation information, remove the operation information from the thread operation queue, wherein the operation information includes thread launch information associated with a launch of the generated threads, and the one or more cores launch the generated threads based on the thread launch information, the operation information further includes thread termination information associated with a termination of the threads launched based on the thread launch information, the receiving the operation information from the thread operation queue includes, in response to completion of the tasks of the launched threads, receiving, by the one or more cores, thread termination information from the thread operation queue, if the one or more cores terminate executing the threads based on the thread termination information, the job descriptor is pushed into a termination queue, and each of the generated threads is launched asynchronously, and each of the launched threads can be terminated asynchronously.

\* \* \* \* \*